United States Patent Office 2,970,966
Patented Feb. 7, 1961

2,970,966

CONTROL OF COMBINED CHLORIDE IN ALUMINA SOL

James Hoekstra, Evergreen Park, Ill., assignor, by mesne assignments, to Universal Oil Products Company, Des Plaines, Ill., a corporation of Delaware No Drawing. Filed Dec. 30, 1957, Ser. No. 705,774

1 Claim. (Cl. 252—313)

The present invention relates to an improvement in the process of producing an alumina sol, containing combined chloride, and is specifically directed to a method for controlling the concentration of the combined chloride within said alumina sol.

Alumina sol is utilized almost exclusively to serve a single purpose—the starting material in the manufacture of alumina (in the form of a highly refractory inorganic oxide). Alumina, however, is employed, in and of itself, in the performance of a multitude of functions. It is utilized to a great extent as porous aluminum oxide throughout the petroleum and chemical industries. Alumina is employed extensively as a dehydrating, treating or purifying agent and is often combined with other refractory inorganic oxides such as silica, zirconia, titania, strontia, etc. Various physical modifications of alumina referred to as activated alumina or activated alumina of commerce are especially employed to take advantage of their unusually high absorptive capacity and pronounced catalytic activity.

In the petroleum industry, alumina is perhaps most widely employed as a catalytically active carrier material for the manufacture of catalytic composites containing one or more metallic and/or non-metallic components. These composites are generally manufactured to contain chlorine and/or fluorine, believed to exist within the catalyst in some combined form, to impart thereto a desired degree of acidity for the purpose of selectively promoting certain particular reactions. Although the addition of either the chlorine or fluorine may be effected in any suitable manner, such as by treating preformed, calcined alumina with hydrochloric acid, hydrofluoric acid or volatile salts such as ammonium chloride and ammonium fluoride, a convenient method of compositing the chloride, for example, is afforded when the alumina is produced from an alumina sol which contains combined chloride. A common method of producing an alumina sol, containing combined chloride, is to react metallic aluminum of high purity with concentrated hydrochloric acid.

After extended periods of time, a catalytic composite becomes substantially deactivated and is no longer capable of performing its intended function. Although many methods are available for the regeneration, or reactivation, of the catalyst, such regenerated catalyst seldom possesses the degree of activity and stability of the catalyst prior to use. With each successive regeneration, there is produced a less stable catalyst having a lesser degree of activity, and eventually, it becomes necessary to replace the catalyst, discarding the "spent" catalyst.

Since catalysts often contain expensive metallic components, particularly noble metals such as platinum or palladium, various processes have been developed in order to recover, and subsequently re-use such metals. Generally, these processes employ a suitably strong chemical reagent in order to dissolve the carrier material, such as alumina, recovering the metallic component as a finely divided sludge. Recent developments in this field have made possible the use of hydrochloric acid which, upon the dissolution of the alumina, results in an alumina sol containing combined chloride. As hereinbefore set forth, such a sol affords many advantages in the preparation of porous aluminum oxide after the removal of any remaining contaminants which might affect adversely either the formation of alumina or its subsequent use as a carrier material for catalytically active components.

One particularly difficult problem inherent in the use of an alumina sol containing combined chloride, whether such sol results from the interaction of pure aluminum metal and hydrochloric acid, or from the digestion of alumina during the recovery of the catalytically active metallic component from "spent" composites, is the concentration of chloride. The chloride concentration must be sufficiently great to insure the promotion of the particular reactions desired, while, at the same time, not in excess of an amount which would promote these same reactions to an extent which is detrimental to catalyst activity and stability. The general practice, when manufacturing the alumina sol from the pure metallic aluminum, is to produce a sol containing an excess of combined chloride, subsequently lowering the concentration to the desired level. In those instances wherein the alumina sol results from the digestion of "spent" catalyst, as a result of the necessity of dissolving substantially all of the alumina, there is inherently produced a sol containing an excess of combined chloride.

An object of the present invention is to decrease the quantity of a combined chloride in an alumina sol, regardless of the source of the sol, thereby permitting the utilization of the sol in the manufacture of an aluminum oxide for use as the carrier material in the production of catlytic composites. A further object is to control the quantity of combined chloride within the sol whereby neither the subsequent addition of, nor removal of, chloride is required.

In one embodiment, the present invention provides an improvement in the process of manufacturing alumina, in the form of a refractory inorganic oxide, from an alumina sol containing combined chloride which comprises contacting said sol with quinoline, separately removing, from the resulting mixture, quinoline hydrochloride, and recovering an alumina sol substantially reduced in chloride concentration.

In a more specific embodiment, the present invention provides an improvement in the process of manufacturing alumina from an aluminum chloride sol, wherein said sol contains excessive quantities of combined chloride, which improvement comprises contacting said sol with a chloroform solution of quinoline, separately removing a chloroform-quinoline hydrochloride mixture, treating said hydrochloride mixture with a strong alkaline reagent and recovering a chloroform-quinoline solution substantially free from quinoline hydrochloride.

Although the chloride concentration of the alumina sol may be reduced through the utilization of quinoline alone, the method of the present invention is facilitated when the quinoline is dissolved in an organic solvent which is immiscible with watter. Any suitable solvent may be employed, however, it is essential to the method of the present invention that said solvent be immiscible with water, and capable of dissolving both quinoline and quinoline hydrochloride. A particularly suitable solvent comprises chloroform which adheres to the above mentioned requirements, and permits the method of the present invention to be effected at atmospheric conditions of temperature and pressure. Higher temperatures and pressures may be employed where desired, however, it is essential to operate the system at a temperature and pressure such that the system remains in the liquid phase. The quinoline concentration, with respect to the concentration of chloride in the alumina sol, depends entirely upon the quantity of chloride to be removed. The amount of solvent is not critical and is simply that amount which is required to facilitate the separation of the dissolved quinoline hydrochloride and quinoline from the alumina sol. I have found that the method of the present invention is readily effected when the solvent to alumina sol volumetric ratio is of the order of about 2:1, and the solvent contains in excess of about 4% quinoline by volume.

In addition to quinoline, other organic nitrogen-containing alkaline compounds may be employed to reduce the concentration of the combined chloride through the formation of the hydrochloride. The use of such other compounds including phenylamine, diphenylamine, alpha and beta naphthylamine, other arylamines, alkylamines, etc., does not yield results equivalent to those experienced through the utilization of quinoline. For example, the use of phenylamine causes premature precipitation of the aluminum when employed in concentrations required to remove substantial amounts of the combined chloride. Also, it is essential that the organic nitrogen-containing alkaline material form a hydrochloride which is effectively insoluble in water, but which is soluble in the particular solvent selected for its dilution. As hereinbefore stated, the solvent is required to be immiscible with water.

The chloroform solution, or other suitable organic solvent, containing quinoline hydrochloride and uncombined quinoline, may be readily regenerated through the utilization of any suitable reagent capable of converting the quinoline hydrochloride to quinoline. Strong alkaline reagents such as an alkali-metal hydroxide are ideally suited for this purpose, and will yield a chloroform-quinoline solution substantially completely free from quinoline hydrochloride. The chloroform-quinoline solution may be recycled to remove additional chloride from the alumina sol.

The following example is given to illustrate further the method of the present invention and the benefits afforded through the utilization thereof. It is not intended that the present invention be limited unduly to the particular reagents, concentrations or conditions employed. Other specific procedures will become evident to those skilled in the art, and it is within the scope of the present invention to employ such other procedures.

*Example*

20 milliliters of quinoline was dissolved in 400 milliliters of chloroform, and the resulting solution was intimately contacted with 200 milliliters of an aluminum chloride solution containing 7% by weight aluminum and 27.8% by weight combined chloride (an aluminum to chloride weight ratio of 0.25). The pH of the aluminum chloride solution was effectively zero prior to the addition of the quinoline-chloroform solution.

The resulting quinoline hydrochloride-chloroform solution was separated from the aluminum chloride, and treated with a 30% by weight solution of sodium hydroxide for the purpose of recovering the quinoline-chloroform solution free from the hydrochloride. The hydrochloride-free quinoline-chloroform solution was then commingled a second time with the aluminum chloride.

This procedure was repeated until the aluminum chloride solution consisted of 5.9% by weight aluminum and 14.4% by weight of chloride (an aluminum to chloride weight ratio of 0.41). The pH of the solution at this time was 2.2.

I claim as my invention:

A method of removing combined chlorine from an alumina sol containing the same which comprises commingling said sol with a chloroform solution of quinoline in liquid phase and reacting the quinoline with at least a portion of said combined chlorine to form quinoline hydrochloride and separating the resultant quinoline hydrochloride-chloroform solution from the alumina sol of reduced chloride concentration.

References Cited in the file of this patent

UNITED STATES PATENTS

| | | |
|---|---|---|
| 2,436,509 | Faust | Feb. 24, 1948 |
| 2,733,205 | Dalton et al. | Jan. 31, 1956 |

FOREIGN PATENTS

| | | |
|---|---|---|
| 458,845 | Canada | Aug. 9, 1949 |
| 727,033 | Great Britain | Mar. 30, 1955 |